Patented Sept. 22, 1931

1,824,093

UNITED STATES PATENT OFFICE

RALPH F. MEYER, OF FREEPORT, PENNSYLVANIA, ASSIGNOR TO MEYER MINERAL SEPARATION COMPANY, OF PITTSBURGH, PENNSYLVANIA

RECOVERY OF PRECIOUS METALS FROM REFRACTORY ORES

No Drawing. Application filed December 13, 1928. Serial No. 325,902.

My invention relates to the treatment of refractory ores containing the precious and base metals, and metalloids, in such a manner as to provide for a maximum recovery of the precious metal-content.

It is well known that it is difficult to obtain from refractory silver bearing ores, for example, a silver-lead-zinc, ore, a fair recovery of the silver-content, as the presence of the lead and zinc interferes with the conversion of the silver-content into a recoverable form. More specifically, my invention is directed to the provision of a roasting and leaching process applicable to refractory ores whereby there is obtained an increased recovery of the precious metal-content. My invention may be said to be characterized by the following features:

1. Roasting of the ore ground to a finely divided state or super-mesh, for example, 150 mesh or finer.

2. Treating or digesting an ore, preferably an oxidized ore, with a sulfate solution capable of forming basic sulfates with the oxids of the ore, and thereafter roasting to obtain the production of sulfates.

3. Sulfating the silver-content of the ore by roasting in presence of zinc sulfate and basic zinc sulfate.

4. Treating or digesting the ore with a solution obtained from leaching roasted ore and reroasting the so-treated ore to form sulfates.

5. Treating or digesting the ore with a solution obtained from leaching of the ore, adding a chlorid and roasting to form chlorids.

6. Treating or digesting an ore with a sulfate solution capable of forming basic sulfates, adding a chlorid and roasting to form chlorids.

7. Treating leaching solutions to obtain basic sulfates and adding these basic sulfates to the ore and then thereafter roasting either to form a sulfate or, by the addition of a chlorid, to form chlorids.

8. Leaching or washing the ore containing silver sulfate with water at ordinary temperature.

9. Leaching or treating the chloridized ore with ammonium carbonate and air.

10. Sulfate roasting in the presence of a small quantity of a base, for example, lime or calcium or magnesium carbonate, to increase the conversion of the silver into sulfate.

11. The presence of sulfate and basic sulfate during the roasting of the ore in order to prevent the silver from forming insoluble compounds with the other constituents of the ore.

In order that my invention may be completely understood by those skilled in the art, various steps comprising the same will be described in connection with the treatment of a specific refractory ore containing silver and a number of base metals and metalloids. It is to be understood, however, that my invention is generally applicable to refractory ores and is not limited to the specific example set forth. The composition of the ore selected to illustrate my invention is as follows:

Zinc _____ 20%
Lead _____ 15%
Iron _____ 1%
Copper _____ 1%
Silver _____ 550 oz. per ton In addition, the ore contained sulfur, antimony, arsenic and small percentages of other base metals.

The ore is first ground to a super-mesh, that is a mesh of 150 or finer. It is very important that the ore be ground to the fineness stated as this has a very considerable influence on the conversion of the silver during roasting into a recoverable form. In general, it may be said that the purpose of roasting refractory silver ores is first, to eliminate the sulfur as a sulfide. It may be converted into sulfur dioxid or sulfuric acid products, which may or may not escape from the ore, and this conversion must be as nearly complete as possible in order to insure a high recovery of the silver-content; second to eliminate other volatile compounds such as arsenic, antimony, bismuth, etc. or oxidize them to inert compounds, which then do not interfere with the extraction of silver. The present practice in grinding ores for roasting is to grind to a fineness of anywhere from 8 to 10 mesh to 60 to 70 mesh, depending upon the ore.

It has been considered unnecessary to grind much finer than 60 or 70 mesh as all ores are supposed to decrepitate when heated and thus permit the air to have intimate contact with the hot ore and oxidize it completely.

Very finely ground ore was considered too dusty and the results did not justify the extra cost of grinding, nor compensate for the supposed dust loss. My experiments have indicated that the present day practices and beliefs are far from being efficient or correct.

When a particle of ore is heated to the decrepitation point it does not break up into very minute particles as one might suppose, but, rather, it remains about the same size and does exhibit many fractures throughout its structure. It is through these fractures that the oxygen of the air must find its way to oxidize completely every particle of the ore.

The larger the particle of the ore the less easily does the oxygen find its way to the center to perform its duty, while on the other hand, the smaller the particle, the easier the oxygen finds its way into it, and a better and more thorough oxidation takes place. The denser the ore, the finer it must be ground. An ore containing zinc blende, for instance, would necessarily be ground very fine. It may be contended that if coarser ground ore were oxidized a sufficiently long time, the oxidation would be just as complete as that of a finer ground ore. However, in a large or coarse particle, the oxygen of the air does not have the same freedom of access to every molecule of the particle and likewise, the oxidation products do not have the same freedom in escaping as is the case with a very small particle. Therefore, when a base ore containing sulfur, arsenic, antimony, etc., is subjected to oxidation and does not have a free access of air, these sulfides, antimonides, arsenides, etc., have a tendency to melt and run together into a complete slag and the particles of ore take on a more or less hard and glassy nature and complete oxidation becomes almost impossible. The hard glassy particle will so cover up and hold the minute particles of silver or gold as to make it very difficult to recover the same, except, by smelting. In roasting coarse ground ore, the above is just what takes place and the precious metals are more or less tightly held in the ore, and not easily attacked by reagents. Therefore, the finer the ore is ground before roasting, the less likelihood of any slagging taking place and the more likelihood of the metal being in a free and exposed condition and thereby more readily attacked by reagents.

I have frequently proven the truth of the above by experiments and therefore, the conclusion is justified that the finer the ore is ground before roasting, the greater is the proportion of free metal particles produced in the roasted ore, and the ore is more easily attacked by reagents whereby a better extraction is assured. I have found by experiments that in every case where two samples of the same ore are roasted under like conditions, the one being ground to 60-70 mesh and the other to 150-250 mesh, the finely ground ore will contain a far larger proportion of free metallic particles of precious metal than the coarser ground ore. Likewise, when the ore is roasted with the intention to sulfate the silver, the coarser ground ore will show a silver sulfatization of from 15 to 25%, while the finely ground ore will show a sulfatization of the silver of from 65 to 75%. As to dusting and dust loss, it may be stated that any base ore containing any considerable amount of sulfur, arsenic, etc. when heated to roasting temperature becomes more or less sticky and therefore dustless, and remains so until the volatile products are nearly eliminated. From this point on the ore requires very much less stirring and thus the dust loss can be kept very low if reasonable precautions are taken.

In roasting of finely ground refractory silver bearing ores for the purpose of sulfating the silver contained therein, the finely ground ore is introduced into any suitable roasting furnace and roasted very slowly with frequent stirring and at a very low, increasing temperature, for example, 8 to 12 hours, more or less in the presence of air and also water vapor or steam. This is what may be termed the oxidizing period. The roasting at a very low temperature should be continued until the greater part of the volatile products have been eliminated. The object to be held in mind at all times, is to produce as much sulfates in the ore as possible and retain them in the ore until the silver is ready to be sulfated. At the end of the oxidizing period if the roasting has been conducted properly, a very large part of the silver and gold will exist in a free metallic form or in such a form as to be easily attacked. A goodly portion of the original sulfur will be present in the form of sulfates and the arsenic, antimony, etc., will have been practically eliminated, or converted into an inert form. The sulfates present will be almost entirely zinc sulfate with very little, if any, iron or copper sulfate. The silver is then ready to be sulfated. The heat is increased until the ore is a cherry red or to a point above the decomposition point of zinc sulfate and basic zinc sulfate, but below the decomposition point of silver sulfate. This heat is maintained for an indefinite period of about two to four hours, sometimes less and sometimes longer, depending on the character of the ore. The roasting at this point must be very thoroughly done at this higher temperature and be continued until the precious metal content becomes amenable to treatment. It is at this point that the greater amount of basic zinc sulphate is formed which then becomes the active reagent throughout the balance of the process both in sulphating the silver and later chloridizing the silver, gold, etc. Also at this point it is very important that the ore had been very finely ground. If it were not ground very fine the precious metals instead of being gradually freed from their refractory compounds and made amenable to treatment; would not only remain refractory but becomes more refractory owing to the matte forming tendencies of a coarser ground ore at this temperature. Furthermore, much less zinc sulphate would be formed, owing to the same tendency as explained before, thereby lessening very considerably its beneficial effects in both the sulphatization and chloridizing steps. The ore must have free access to air and water vapor or steam at all times and particularly during the silver sulfating period. Further, the ore is stirred very much less.

The ore is thereafter withdrawn from the furnace and when cool, is ready to be leached for silver sulfate. During the oxidation period the sulfides of the ore at different periods are partly broken down to oxids. Iron sulphates form at the lower temperatures, copper sulfates at a little higher temperature and zinc sulfates at a still higher temperature. As the temperature is increased, first, the iron sulfates break down to oxids, then the copper sulfates to oxids and finally at the sulfating temperatures of silver, of the three mentioned sulfates, practically zinc sulfate alone remains. Iron sulfate, copper sulfate and basic zinc sulfate when decomposed give off sulfuric anhydride in a nascent state, which will attack silver and silver compounds to form silver sulfate. However, at the decomposition temperature of iron and copper sulfates the silver in refractory ores (such as those containing zinc blende) is not yet in a condition to be attacked by the sulfuric anhydrid. That is to say, before the time the silver is all freed, the iron and copper sulfates have already been broken down to oxids and can have no further action on the silver. Thus, practically no sulfates remain except zinc sulfate. Zinc sulfate first breaks down to basic sulfate and this operation seemingly has no effect on the silver, but when the basic zinc sulfate breaks down, sulfuric anhydrid is given off and this anhydrid does attack the silver; in fact as much as, that 65% to 75% of the silver can be sulfated in a single roast.

I have also found that the addition of a small amount of a base such as lime or calcium or magnesium carbonate has a very beneficial effect on the sulfating of the silver. However, the base must not be present in sufficient quantities as to combine with any large part of the sulfates, otherwise the action ceases. For example, the addition of 1% to 2% of lime has been found satisfactory with most ores. However, the amount of sulfate present governs the amount of the base needed. Most ores have sufficient bases and need no addition. The addition of a base has a beneficial effect in the forming of basic sulfates thus increasing the amount of sulfuric anhydrid given off. The sulfating temperature must not be maintained until a large part of the zinc sulfate has been decomposed. A certain amount of zinc sulfate must always be present to protect the metallic particles and prevent them forming, at this temperature, insoluble compounds with other constituents of the ore.

Another important reaction which takes place in a sulfating roast after the iron and copper sulfates have been decomposed, is that of the nascent sulfuric anhydrid given off by basic zinc sulfate, when being decomposed. This sulfuric anhydrid not only sulfates the free metallic particles already existing in the ore by reason of the oxidation process but also has an energetic oxidizing action on complex slag or matte compounds which hold in combination some of the silver. By this oxidation, more metallic silver is again produced in the ore which then is readily sulfated by more sulfuric anhydrid. Furthermore, as long as sufficient zinc sulfate is present in the ore to furnish basic sulfate and, in turn, sulfuric anhydrid the silver is protected, so to speak, from slag or matte forming tendencies. Moreover, the sulfating of silver by means of basic zinc sulfate has a great advantage over copper sulfate or iron sulfate in as much as it breaks down at a considerably higher temperature than either of the other two.

By reason of the fact that some slag or matte compounds which contain silver are only oxidized at a temperature higher than the decomposition point of either iron or copper sulfates, they are not affected by the sulfuric anhydrid given off by iron and copper sulfates. This is one reason why the old method of sulfating silver was not applicable to ores containing much zinc or lead. Gold and other precious metals which are not subject to sulphatization are by this method of roasting made free or in such a state as to be easily chloridized in the following steps of my process.

After the ore has been roasted according to the process set forth, it is subjected to a leaching step. The roasted ore should be leached with water at the ordinary temperature as warm or hot water, will, in the presence of various oxids in the ore, have decomposing effect on the silver sulfate with a consequent loss in recovery. A temperature of 15° to 30° C. has been found satisfactory.

The silver may be recovered from the leaching solution by precipitating on iron, copper, zinc, etc., or electrolytically by methods which are well known. If the ore is of sufficiently high grade as to justify a second roast the silver free leaching solution containing practically nothing but zinc sulfate, is added to the ore and the same digested for a time and then roasted for sulfate as before. By digesting the leached ore in the hot zinc solution, basic zinc sulfate is formed due to the zinc oxid and other oxids acting upon the zinc sulfate. The basic sulfate, being insoluble in the water is precipitated in and through the ore. The ore is thereafter dried and roasted at a cherry red heat to sulfate the remaining silver just as in the preceding roast. In this roast the oxidation period is eliminated. The roasted and cooled ore is again leached and the silver recovered as before. The ore, after either the first or second roast, is ready to be chloridized. The digestion in ore treating with zinc sulfate solution may or may not be necessary, depending upon how much basic sulfate has been formed during the roasting of the ore.

If it is desired to eliminate the digestion of the ore in the sulfate solution for the purpose of forming basic sulfates, it may be readily accomplished in the following manner: The leaching solution is passed over the ore several times before drying and roasting again. This procedure is only suitable for low grade ores. Further, the sulfate solution itself may be treated to obtain the basic sulfate which may be then intimately mixed with the ore before roasting either to obtain the sulfate or the chlorid. Under some circumstance, a basic sulfate of zinc may be obtained from a source other than the ore being treated, and mixed with the ore and roasted to obtain the sulfate or chlorid. However, I have found that more uniform results are obtained by digesting the ore in the sulfate solution.

Furthermore, in case an ore is being roasted that does not furnish sufficient zinc sulfate to carry out the sulfating reactions it can be handled in the following manner: The ore is roasted just as described in the oxidizing and sulfating procedure and is cooled and leached with the leach water obtained from previous roasts. This leach water gradually becomes strong in zinc sulfate, and from time to time is freed from silver. The roasted ore is digested in the strong leach solution and roasted for sulfate or chlorid as desired. In this case it is usually preferable to roast to obtain the chlorid as a very high extraction can be obtained in this one chloridizing roast. In the case of an oxidized ore the sulfate roasting can sometimes be eliminated by digesting the oxidized ore in zinc sulfate and roasting to obtain the sulfate or chlorid. In this case the zinc sulfate would necessarily be obtained from other sources. Also the basic zinc sulfate could be added directly to the ore and same roasted for chlorid.

It is maintained by many authorities in the art, that zinc sulfate and its decomposition products, has no part, either in the sulfating or chloridizing of silver, during the treatment in the furnace. However, I have proven by many experiments that the decomposition products of zinc sulfate play a very important part in both the sulfating and chloridizing of silver. In fact, it can easily be proven in the case of refractory silver-zinc-lead-ores that at the time when the iron and copper sulfates have all been broken down to oxids, a large part of the silver contained in the ore will still be in an insoluble condition. If the temperature is then slowly increased to the decomposition point of basic zinc sulfate and maintained for a time, the silver in the ore will be gradually freed and then converted to sulfate. Furthermore, after the ore has been roasted once and leached and probably 65% of the silver removed as soluble silver sulfate, the ore is then digested in the hot zinc sulfate solution for a time, to form basic zinc sulfate. The zinc solution contains nothing but zinc sulfate and the basic sulfate is formed by the action upon it, of the oxids present in the ore. This digested ore is then dried and reroasted as before, to sulfate the silver and 20 to 25% of the total silver is converted to soluble sulfate form, by this second roast. In this second roast it is quite evident that no sulfate of iron or copper could be present and still 20 to 25% of the silver has been converted to sulfate. Further, in silver-zinc-lead ores containing no copper, the same reactions occur. Also, before roasting for the purpose of chloridizing the remaining silver in the ore, the ore is again digested with zinc sulfate to precipitate basic zinc in the ore. Here again, it is evident that no iron or copper sulfate could be present and thus, the reactions are caused by the basic zinc sulfate present. Thus, for example, a refractory zinc lead silver ore containing 20% zinc, 15% lead, 1% iron, 1% copper, a little antimony and arsenic and 550 oz. silver per ton was roasted as per above method. The first roast recovered 65% of the silver as soluble silver sulfate. The second roast recovered 20% as sulfate and the chloridizing roast recovered 12% as silver chlorid, making a total recovery of 97%. The idea of precipitating a basic sulfate in the ore before roasting can also be applied by using sulfates of iron, copper or zinc or any sulfate forming a basic sulfate. The use of sulfate solution obtained from the ore is of considerable importance in lessening the cost of treatment.

The roasted ore either from the first roast or from the second roast, after having been well digested in the sulfate preferably in a hot solution obtained from leaching the ore or otherwise, is dried and pulverized with a small quantity of any suitable chlorid, preferably sodium chlorid, owing to its cheapness, introduced into any suitable furnace and heated to a dull redness for a comparatively short period. In most cases one hour is sufficient. The chlorid may also be added to the digesting solution, in which case sufficient chlorid would remain in the ore to act upon all the silver and gold. Thus it would be unnecessary to add chlorid after drying. The remaining silver in the ore is practically all converted to chlorid. The ore is withdrawn from furnace and the silver chlorid leached out with any suitable reagent, such as cyanide or hypo (sodium thiosulfate). It is preferred to leach with ammonium carbonate, as both the silver and copper are recovered. I have found that in leaching with ammonium carbonate, it is of great benefit to pass air through, or agitate the ore in the solution with a current of air. The extraction is not only quickened but also increased over that obtained without using air. The silver may be obtained from this solution by precipitation with copper, aluminum, zinc, etc. or the ammonia solution may be evaporated to drive off the ammonia and the silver compound, with any copper or zinc compounds present, will be precipitated in solution and may then be filtered out. I prefer to precipitate the silver with copper, as it is then recovered as metallic silver in a very pure state. In case the ore contains gold it is also partly chloridized as well as the silver provided the ore is cooled very slowly after chlorid roasting. The cooled ore is first leached with water to remove soluble gold chlorid and the water leached ore is then leached for silver chlorid. The gold chlorid obtained by leaching with water is readily reduced to metallic gold.

The term "refractory ore" as used in the specification and claims, includes those ores which contain precious and base metals and metalloids. Obviously, it is within the spirit of my invention to add either base or metalloid compounds if the original ore does not contain the same, or to mix different types of ores so that the composition of the mixture approximates that of the naturally occurring refractory ore. Further, the term "finely grinding the ore to a super-mesh" is intended to exclude the coarse grinding of the prior art, such as 60 to 70 mesh or possibly 100 mesh.

What I claim and desire to secure by Letters Patent is:—

1. The process of treating refractory ores containing silver, comprising effecting a sulfate roasting of the ore so as to allow the formation of a basic metal sulfate functioning to increase the amount of recoverable silver, leaching the roasted ore to produce a filtrate and a residue, recovering from the leaching solution silver and a sulfate solution, treating the residue with the sulfate solution to precipitate therein a basic sulfate and subjecting the so-treated residue to a second sulfate roast.

2. The process of treating refractory silver ores containing zinc comprising effecting a sulfate roasting of the ore so as to allow the formation of a basic zinc sulfate functioning to increase the amount of recoverable silver, leaching the roasted ore to produce a zinc sulfate solution and a residue, treating the residue with the zinc sulfate solution to precipitate therein basic zinc sulfate, and subjecting the so-treated residue to a second sulfate roast.

3. The process of treating refractory ores comprising effecting a sulfate roasting of the ore so as to allow the formation of a basic base-metal sulfate functioning to increase the amount of recoverable precious metal, leaching the roasted ore to produce a filtrate and a residue, recovering from the filtrate precious metal and a sulfate solution, treating the residue with the sulfate solution to precipitate therein a basic sulfate, and chlorid roasting the resulting product.

4. The process of treating refractory silver ores containing zinc comprising effecting a sulfate roasting of the ore so as to allow the formation of a basic zinc sulfate functioning to increase the amount of recoverable silver, leaching the roasted ore to produce a zinc sulfate solution and a residue, treating the residue with zinc sulfate solution to precipitate therein basic zinc sulfate, subjecting the so-treated residue to a second sulfate roast, leaching the resulting product to recover the silver-content and a residue, treating the latter with zinc sulfate solution to precipitate therein basic zinc sulfate and chlorid roasting the so-treated product.

5. The process of treating refractory ores comprising effecting a sulfate roasting of the ore so as to allow the formation of a basic base-metal sulfate functioning to increase the amount of recoverable precious metal, leaching the roasted ore to produce a filtrate and a residue, recovering from the filtrate precious metal and a sulfate solution, treating the residue with the sulfate solution to precipitate therein a basic sulfate, subjecting the so-treated residue to a second sulfate roast, leaching the resulting product to recover the precious metal-content and a residue, treating the latter with a base-metal sulfate solution to precipitate therein basic-base-metal sulfate, and chlorid roasting the so-treated product.

In testimony whereof I affix my signature

RALPH F. MEYER.